C. Hughes.
Condensing Valve.

No. 97,406. Patented Nov. 30, 1869.

Witnesses:
Jno A Brook
O Hinchman

Inventor:
Chas Huges
per Munn & Co
atty.

United States Patent Office.

CHARLES HUGHES, OF YNG FLOR DE CUBA, COLEN, CUBA.

Letters Patent No. 97,406, dated November 30, 1869.

IMPROVEMENT IN CONDENSER-VALVES.

The Schedule referred to in these Letters Patent and making part of the same.

*To all whom it may concern:*

Be it known that I, CHARLES HUGHES, of Yng Flor de Cuba, Colen, Island of Cuba, have invented a new and useful Improvement in Valves; and I do hereby declare that the following is a full, clear, and exact description thereof, which will enable others skilled in the art to make and use the same, reference being had to the accompanying drawing, forming part of this specification.

This invention relates to a new and useful improvement in valves, for spreading and spraying the water in jet and surface-condensers, and consists in a perforated disk on a valve-stem within the condenser, whereby the condensing-jet is divided and reduced to spray, so as to act directly and perfectly on the steam, to condense it, and produce the required vacuum.

In the accompanying sheet of drawings—

Similar letters of reference indicate corresponding parts.

Figure 1:
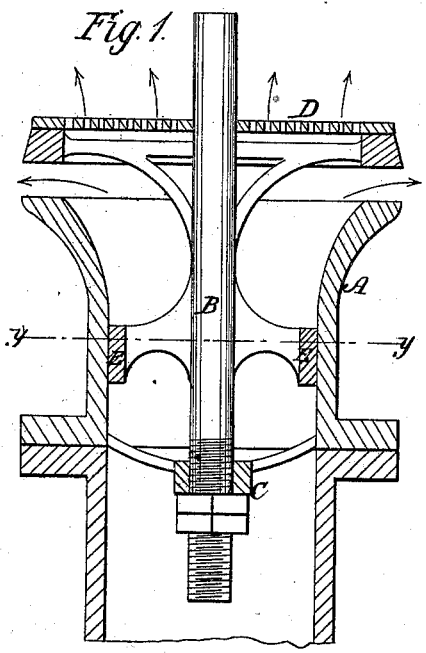
Figure 1 represents a vertical section of the valve, through the line $x$ $x$ of fig. 2, showing its form and the manner of construction, with its seat and a section of the jet-pipe shown in red color.
Figure 2:
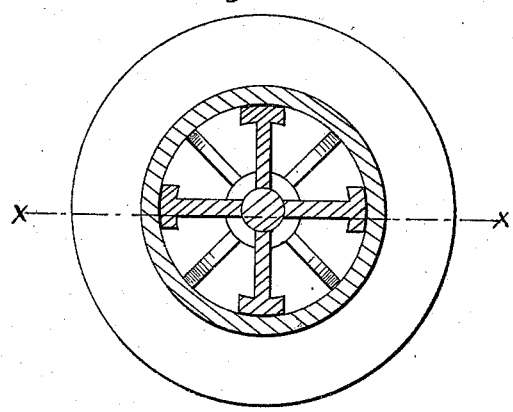
Figure 2 is a horizontal section of fig. 1, through the line $y$ $y$.

A is the shell, in which the valve works, the top of which forms the seat, and the bottom of which supports and guides the valve-stem, and is connected with the jet-pipe, as seen in the drawing, the latter being seen in red color.

B is the valve-stem, which is guided by the lower part of the shell, and is adjusted by the nuts, as seen at C.

D is the valve. This valve has its seat on the shell A, when closed. It is a disk, perforated with small holes, as seen in the drawing. It is raised from its seat by the force of the water injected, and, whether the water be forced in by a pump, or from a fountain-head, by its own pressure, it is minutely divided by passing through the perforations of the valve, and being deflected, and thrown laterally in all directions by the vaive-disk, so that the jet will assume the appearance of an umbrella in form.

In this manner the jet, by means of the valve, acts upon the steam when placed in the condensing-vessel. The effect is instantaneous, and most effectual in all respects.

The lift of the valve is governed by the nuts and the screw-thread at C, and it is guided not only by the stem or spindle B, but by the wing-guides E E, and the inside of the shell A, as seen in the drawing. The provision thus made is ample for keeping the valve in a perpendicular position at all times.

In the use of this valve, I do not confine myself exclusively to the condensing of steam, but design to use it for cooling water in surface-condensers, so that the same may be used over and over, as injection-water, and for other purposes.

Having thus described my invention,

What I claim as new, and desire to secure by Letters Patent, is—

The valve C, constructed, arranged, and operating substantially as herein shown and described.

The above specification of my invention signed by me, this 19th day of January, 1869.

CHARLES HUGHES.

Witnesses:
A. J. MORISON,
H. R. DE LA REINTRIE.